US012556323B2

(12) United States Patent
Nam et al.

(10) Patent No.: US 12,556,323 B2
(45) Date of Patent: Feb. 17, 2026

(54) BANDWIDTH PART (BWP) FREQUENCY HOPPING

(71) Applicant: QUALCOMM Incorporated, San Diego, CA (US)

(72) Inventors: Wooseok Nam, San Diego, CA (US); Peter Pui Lok Ang, San Diego, CA (US); Iyab Issam Sakhnini, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 17/160,709

(22) Filed: Jan. 28, 2021

(65) Prior Publication Data

US 2021/0242985 A1 Aug. 5, 2021

Related U.S. Application Data

(60) Provisional application No. 62/969,426, filed on Feb. 3, 2020.

(51) Int. Cl.
*H04L 5/00* (2006.01)
*H04B 7/06* (2006.01)
(Continued)

(52) U.S. Cl.
CPC ......... *H04L 5/0012* (2013.01); *H04B 7/0626* (2013.01); *H04L 5/0048* (2013.01);
(Continued)

(58) Field of Classification Search
CPC ...... H04W 8/24; H04W 24/10; H04L 5/0023; H04L 5/0048; H04L 5/0092;
(Continued)

(56) References Cited

U.S. PATENT DOCUMENTS

| | | | |
|---|---|---|---|
| 8,345,726 B1 * | 1/2013 | Haendel ................ | H04B 1/713 375/135 |
| 10,587,304 B2 * | 3/2020 | Tang ..................... | H04B 1/713 |

(Continued)

FOREIGN PATENT DOCUMENTS

| | | | | |
|---|---|---|---|---|
| CA | 3087852 A1 | 7/2019 | | |
| CA | 3063213 A1 * | 12/2019 | ........... | H04B 7/0404 |

(Continued)

OTHER PUBLICATIONS

CATT: "Timer based Uplink BWP Switch", 3GPP Draft, 3GPP TSG-RAN WG2 Meeting #105bis, R2-1903121, 3rd Generation Partnership Project (3GPP), Mobile Competence Centre, 650, Route Des Lucioles, F-06921 Sophia-Antipolis Cedex, France, vol. RAN WG2, No. Xian, China, 28198488-28198412, Apr. 6, 2019 (Apr. 6, 2019), XP051700475, 3 Pages.

(Continued)

*Primary Examiner* — Noel R Beharry
*Assistant Examiner* — Rodrick Mak
(74) *Attorney, Agent, or Firm* — Patterson + Sheridan, L.L.P.

(57) ABSTRACT

Certain aspects of the subject matter described in this disclosure can be implemented in a method for wireless communication by a user equipment (UE). The method generally includes receiving, from a network entity, a configuration for a first bandwidth part (BWP) configured with frequency hopping, determining a frequency location of the first BWP during each of a plurality of frequency hops for the frequency hopping based on a reference frequency location, and communicating with the network entity via the first BWP and in accordance with the configuration.

30 Claims, 9 Drawing Sheets

(51) Int. Cl.
*H04W 8/24* (2009.01)
*H04W 24/10* (2009.01)

(52) U.S. Cl.
CPC ............. *H04L 5/0092* (2013.01); *H04W 8/24* (2013.01); *H04W 24/10* (2013.01)

(58) Field of Classification Search
CPC ....... H04L 5/0012; H04L 5/16; H04B 1/7136; H04B 1/7143; H04B 7/0626; H04B 7/0695
See application file for complete search history.

(56) References Cited

U.S. PATENT DOCUMENTS

| | | | |
|---|---|---|---|
| 2016/0211904 A1* | 7/2016 | Kim | H04B 7/0632 |
| 2018/0376473 A1 | 12/2018 | Wang et al. | |
| 2019/0036665 A1* | 1/2019 | Park | H04L 5/0091 |
| 2019/0037529 A1* | 1/2019 | Edge | H04B 7/0452 |
| 2019/0116588 A1* | 4/2019 | Xiong | H04L 1/1671 |
| 2019/0132817 A1 | 5/2019 | Liu et al. | |
| 2019/0394760 A1 | 12/2019 | Hwang et al. | |
| 2020/0008203 A1* | 1/2020 | Xia | H04W 72/23 |
| 2020/0022127 A1* | 1/2020 | Li | H04L 5/0082 |
| 2020/0068492 A1* | 2/2020 | Lee | H04W 52/0261 |
| 2020/0137745 A1* | 4/2020 | Bachu | H04L 5/0091 |
| 2020/0213997 A1* | 7/2020 | Lu | H04L 1/16 |
| 2020/0275437 A1* | 8/2020 | Shi | H04L 5/0053 |
| 2021/0029731 A1* | 1/2021 | Kundu | H04W 72/02 |
| 2022/0029659 A1* | 1/2022 | Liu | H04B 1/7143 |
| 2022/0085934 A1* | 3/2022 | Choi | H04W 72/0446 |
| 2023/0090288 A1* | 3/2023 | Sakhnini | H04W 72/51 370/329 |

FOREIGN PATENT DOCUMENTS

| | | |
|---|---|---|
| CN | 108521850 A | 9/2018 |
| CN | 109803407 A | 5/2019 |
| EP | 3393147 A1 | 10/2018 |
| EP | 4089971 A1 | 11/2022 |

OTHER PUBLICATIONS

Ericsson: "Summary of Remaining Issues on Short PUCCH", 3GPP Draft, 3GPP TSG RAN WG1 Meeting#92bis, 3GPP TSG RAN WG1 Meeting#92bis, R1-1805561, 3rd Generation Partnership Project (3GPP), Mobile Competence Centre, 650, Route Des Lucioles, F-06921 Sophia-Antipolis Cedex, France, vol. RAN WG1, No. Sanya, China; Apr. 16, 2018-Apr. 28, 2018 Apr. 16, 2018 (Apr. 16, 2018), XP051427567, 13 Pages.

International Search Report and Written Opinion—PCT/US2021/015834—ISA/EPO—May 20, 2021.

NTT DOCOMO: et al., "Enhanced UL Transmission with Configured Grant for URLLC", 3GPP Draft, 3GPP TSG RAN WG1 #96, R1-1902809, Enhanced UL Configured Grant, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Feb. 31, 2019 Feb. 16, 2019 (Feb. 16, 2019), XP051600504, 8 Pages.

OPPO: "Text Proposal for UL Transmission Procedure", 3GPP Draft, 3GPP TSG RAN WG1 Meeting AH 1801, R1-1800513, Text Proposal for UL Transmission Procedure, 3rd Generation Partnership Project (3GPP), Mobile Competence Centre, 650, Route Des Lucioles, F-06921 Sophia-Antipolis Cedex, Fra, vol. RAN WG1, No. Vancouver, Canada, Jan. 22, 2018-Jan. 26, 2018, Jan. 12, 2018 (Jan. 12, 2018), XP051384372, 5 Pages.

* cited by examiner

BANDWIDTH PART (BWP) FREQUENCY HOPPING

CROSS-REFERENCE TO RELATED APPLICATION

This application claims benefit of and priority to U.S. Provisional Application No. 62/969,426, filed Feb. 3, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for frequency hopping.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved performance efficiency while operating in a narrow bandwidth.

Certain aspects of the subject matter described in this disclosure may be implemented in a method for wireless communication by a user equipment (UE). The method generally includes receiving, from a network entity, a configuration for a first bandwidth part (BWP) configured with frequency hopping, determining a frequency location of the first BWP during each of a plurality of frequency hops for the frequency hopping based on a reference frequency location, and communicating with the network entity via the first BWP and in accordance with the configuration.

Certain aspects of the subject matter described in this disclosure may be implemented in a method for wireless communication. The method generally includes transmitting, to a UE, a configuration for a first BWP configured with frequency hopping, determining a frequency location of the first BWP during each of a plurality of frequency hops for the frequency hopping based on a reference frequency location, and communicating with the UE via the first BWP and in accordance with the configuration.

Certain aspects of the subject matter described in this disclosure may be implemented in an apparatus for wireless communication by a UE. The apparatus generally includes a memory and one or more processors coupled to the memory, the memory and the one or more processors being configured to receive, from a network entity, a configuration for a first BWP configured with frequency hopping, determine a frequency location of the first BWP during each of a plurality of frequency hops for the frequency hopping based on a reference frequency location, and communicate with the network entity via the first BWP and in accordance with the configuration.

Certain aspects of the subject matter described in this disclosure may be implemented in an apparatus for wireless communication. The apparatus generally includes a memory and one or more processors coupled to the memory, the memory and the one or more processors being configured to transmit, to a UE, a configuration for a first BWP configured with frequency hopping, determine a frequency location of the first BWP during each of a plurality of frequency hops for the frequency hopping based on a reference frequency location, and communicate with the UE via the first BWP and in accordance with the configuration.

Certain aspects of the subject matter described in this disclosure may be implemented in an apparatus for wireless communication by a UE. The apparatus generally includes means for receiving, from a network entity, a configuration for a first BWP configured with frequency hopping, means for determining a frequency location of the first BWP during each of a plurality of frequency hops for the frequency hopping based on a reference frequency location, and means for communicating with the network entity via the first BWP and in accordance with the configuration.

Certain aspects of the subject matter described in this disclosure may be implemented in an apparatus for wireless communication. The apparatus generally includes means for transmitting, to a UE, a configuration for a first BWP configured with frequency hopping, means for determining a frequency location of the first BWP during each of a plurality of frequency hops for the frequency hopping based on a reference frequency location, and means for communicating with the UE via the first BWP and in accordance with the configuration.

Certain aspects of the subject matter described in this disclosure may be implemented in a computer-readable medium having instructions stored thereon to cause a UE to receive, from a network entity, a configuration for a first BWP configured with frequency hopping, determine a frequency location of the first BWP during each of a plurality of frequency hops for the frequency hopping based on a reference frequency location, and communicate with the network entity via the first BWP and in accordance with the configuration.

Certain aspects of the subject matter described in this disclosure may be implemented in a computer-readable medium having instructions stored thereon to cause an apparatus to transmit, to a UE, a configuration for a first BWP configured with frequency hopping, determine a frequency location of the first BWP during each of a plurality of frequency hops for the frequency hopping based on a reference frequency location, and communicate with the UE via the first BWP and in accordance with the configuration.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
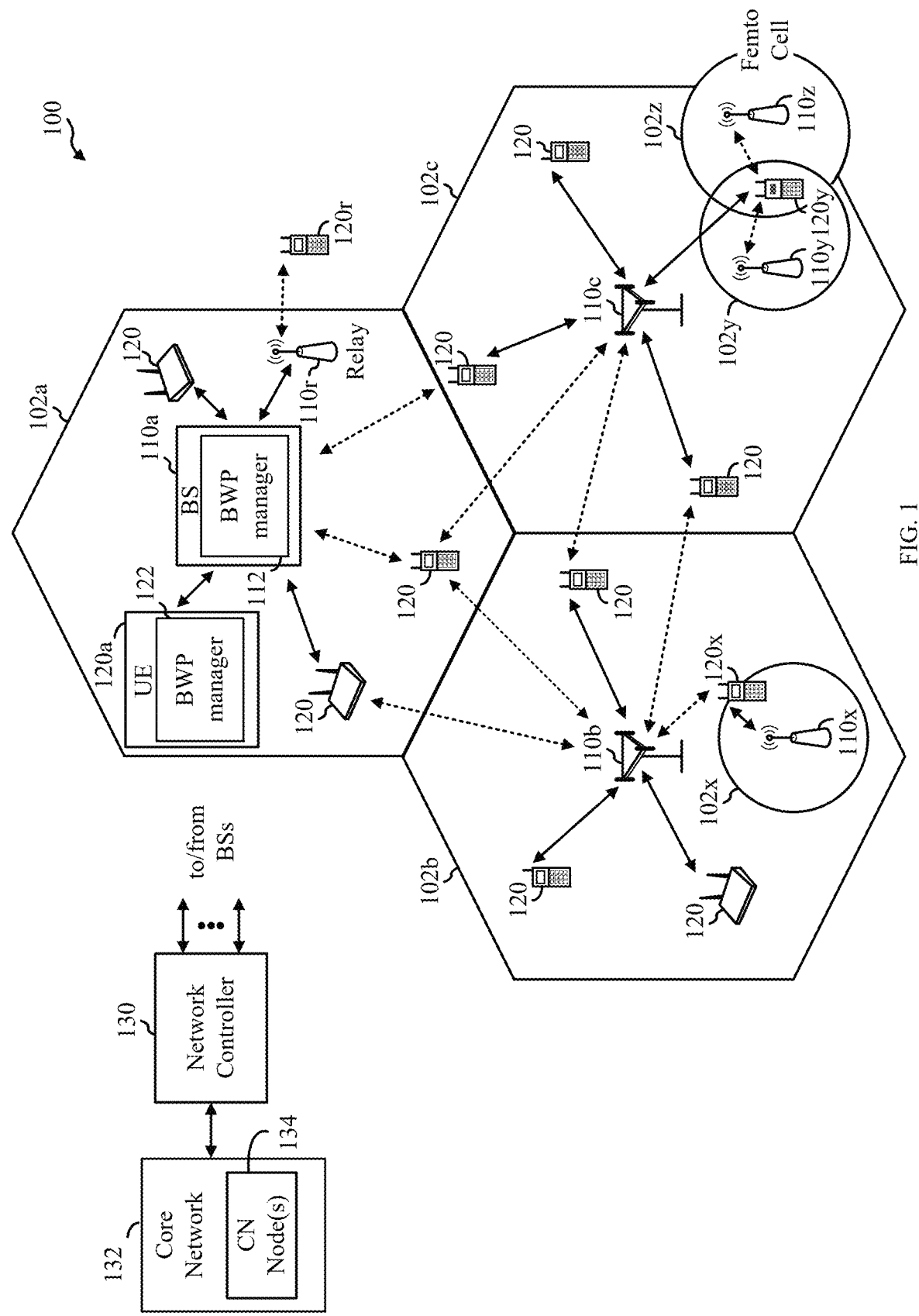
FIG. 1 is a block diagram conceptually illustrating an example telecommunications system, in accordance with certain aspects of the present disclosure.

Aspects of the present disclosure provide apparatus, methods, processing systems, and computer-readable mediums for bandwidth part (BWP) frequency hopping. For example, frequency hopping may be implemented within a BWP. The frequency location of the BWP may be configured with respect to a reference frequency location. For example, the frequency location of a BWP during each frequency hop may be determined based on a frequency hopping sequence or a fixed frequency offset from the reference frequency location.

The following description provides examples of per-BWP frequency hopping in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for communication with one another using per-BWP frequency hopping. As shown in FIG. 1, the BS 110a includes a BWP manager 112. The BWP manager 112 may be configured to transmit, to a user-equipment (UE), a configuration for a first BWP configured with frequency hopping, determine a frequency location of the first BWP during each of a plurality of frequency hops for the frequency hopping based on a reference frequency location, and communicate with the network entity via the first BWP and in accordance with the configuration. As shown in FIG. 1, the UE 120a includes a BWP manager 122. The BWP manager 122 may be configured to receive, from a network entity, a configuration for a first BWP configured with frequency hopping, determine a frequency location of the first BWP during each of a plurality of frequency hops for the frequency hopping based on a reference frequency location, and communicate with the network entity via the first BWP and in accordance with the configuration.

Figure 2:
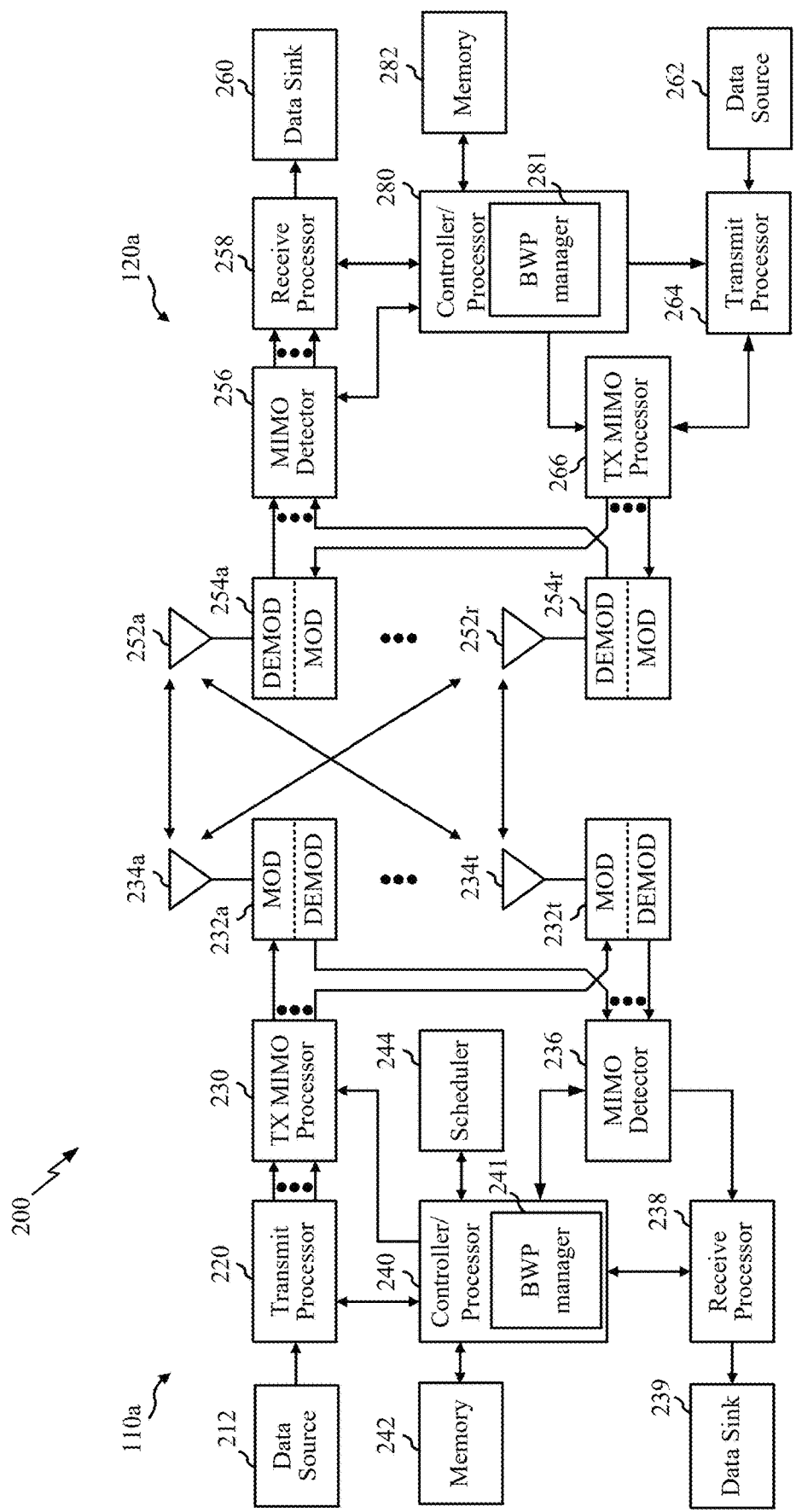
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a BWP manager 241 that may be configured to transmit, to a UE, a configuration for a BWP configured with frequency hopping, determine a frequency location of the first BWP during each of a plurality of frequency hops for the frequency hopping based on a reference frequency location, and communicate with the network entity via the first BWP and in accordance with the configuration. As shown in FIG. 2, the controller/processor 280 of the UE 120a has a BWP manager 281 that may be configured to receive, from a network entity, a configuration for a BWP configured with frequency hopping, determine a frequency location of the first BWP during each of a plurality of frequency hops for the frequency hopping based on a reference frequency location, and communicate with the network entity via the first BWP and in accordance with the configuration. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
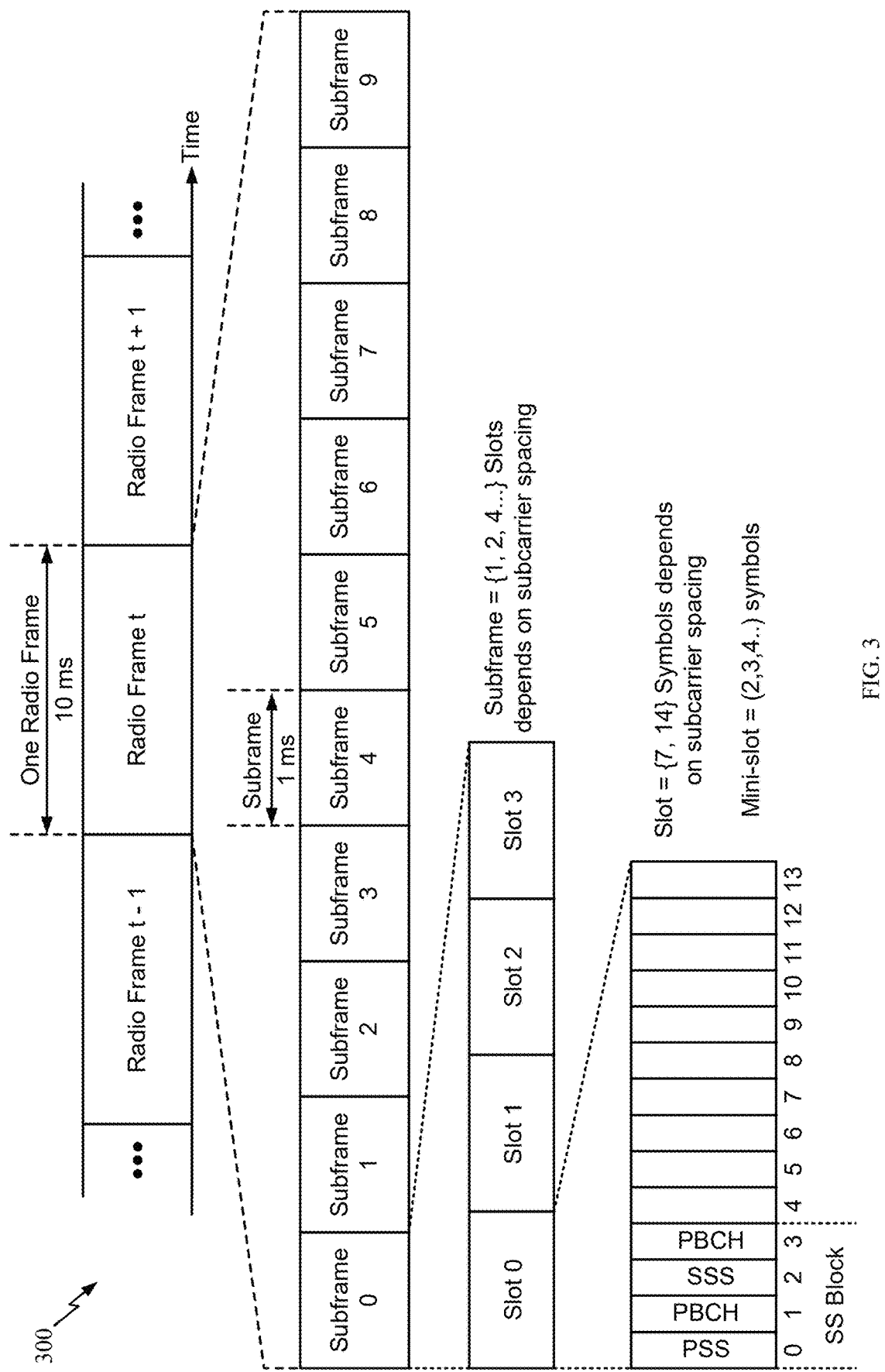
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Techniques for Frequency Hopping

Certain aspects of the present disclosure generally relate to frequency hopping of a bandwidth part (BWP) in a carrier bandwidth. Frequency hopping may be motivated by improving frequency diversity within a narrow band of operation and mitigating (or at least reduce) frequency-selective interference. For example, intra-BWP frequency hopping may be implemented for a physical uplink control channel (PUCCH) and a physical uplink shared channel in certain implementations. In some cases, BWP switching for downlink (DL) signaling may be implemented. For example, cross-BWP scheduling may be employed by using control signaling in one BWP to schedule resources in another BWP. To facilitate reduced bandwidth (BW) operation, a narrow BWP (NBWP) may be deployed in certain configurations. For example, after connection establishment (e.g., of an initial BWP), a UE may switch to a NBWP among multiple NBWPs to reduce radio frequency (RF) power consumption.

To mitigate potential performance loss due to reduced bandwidth operation, frequency hopping may be implemented. In some cases, intra-BWP/intra-slot frequency hopping may be deployed. In this case, since the frequency hopping may be within a BWP, the BW of the BWP may be configured to be large enough for higher diversity. Moreover, since the frequency hopping takes place back to back within a slot or across slots, the UE may have to either maintain the RF bandwidth open for the entire BWP, resulting in increased power consumption, or the UE should have the capability to rapidly switch from one RF band to another RF band within the BWP, which may be difficult to achieve.

In some cases, BWP switching among multiple NBWPs may be implemented. The BWP configuration, such as the number of configurable BWPs and dynamic BWP switching, may be specific to each UE and its capability. Moreover, since only up to four BWPs may be supported in some deployments (e.g., in new radio (NR) Release 15), the diversity gain associated with BWP switching may be limited. In some implementations, a downlink (DL)/uplink (UL) data transmission may be confined within a BWP. As result, duplicated or redundant transmissions over multiple BWPs, which is important to achieve the frequency diversity gain, may not be supported in such implementations.

Certain aspects of the present disclosure are generally directed to techniques for frequency hopping of a BWP (e.g., also referred to as per-BWP frequency hopping). For example, certain aspects provide configuration aspects, associated procedures, and triggering mechanisms for per-BWP frequency hopping, allowing operations within a narrow bandwidth (e.g., NBWP) while maintaining communication efficiency.

Figure 4:
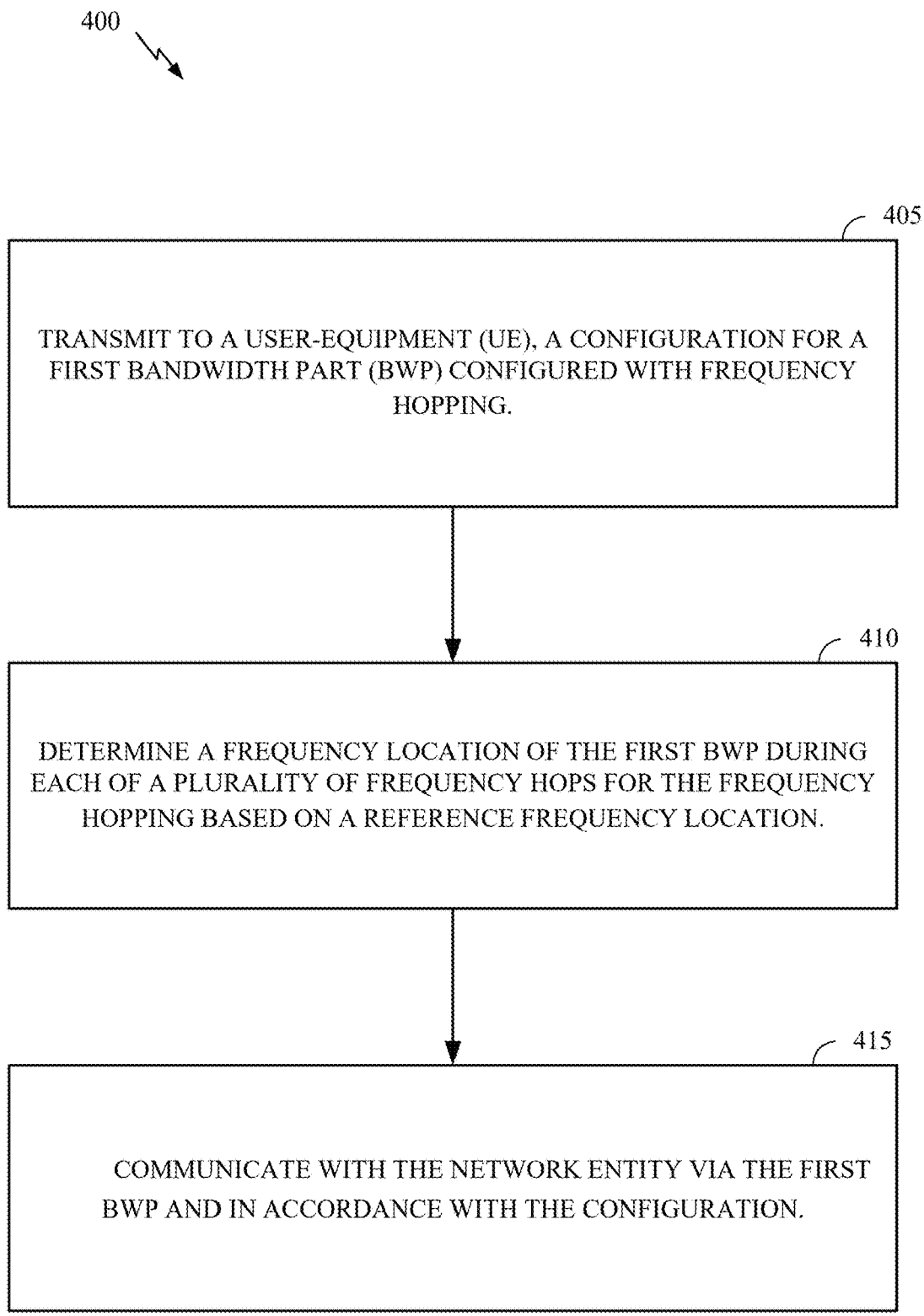
FIG. 4 is a flow diagram illustrating example operations for wireless communication by a network entity, in accordance with certain aspects of the present disclosure.

FIG. 4 is a flow diagram illustrating example operations 400 for wireless communication, in accordance with certain aspects of the present disclosure. The operations 400 may be performed, for example, by a network entity such as a BS (e.g., BS 110*a* in the wireless communication network 100).

Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 400 may begin, at block 405, with the network entity transmitting, to a UE, a configuration for a first BWP configured with frequency hopping. Operations 400 may continue, at block 410, with the network entity determining a frequency location of the first BWP during each of a plurality of frequency hops for the frequency hopping based on a reference frequency location, and at block 415, communicating with the UE via the first BWP and in accordance with the configuration.

Figure 5:
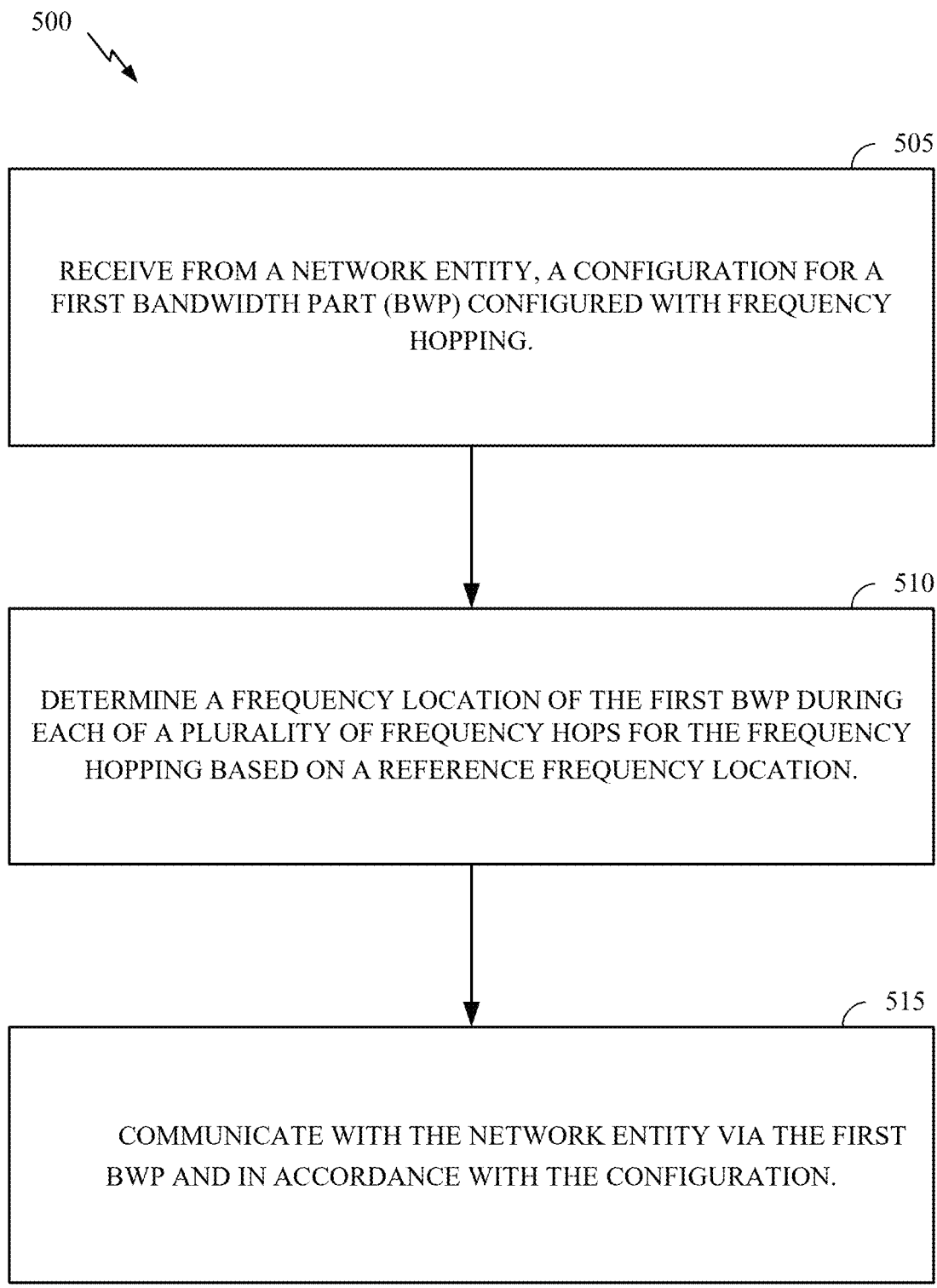
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., such as a UE 120*a* in the wireless communication network 100). The operations 500 may be complimentary operations by the UE to the operations 400 performed by the network entity.

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, with the UE receiving, from a network entity, a configuration for a first bandwidth part (BWP) configured with frequency hopping. Operations 500 may continue, at block 510, with the UE determining a frequency location of the first BWP during each of a plurality of frequency hops for the frequency hopping based on a reference frequency location, and at block 515, communicating with the network entity via the first BWP and in accordance with the configuration.

In other words, a type of floating BWP may be configured (e.g., floating from one frequency location to another), also referred to herein a per-BWP frequency hopping. For instance, the frequency-domain location of a BWP (e.g., $$N_{BWP}^{start}$$

Figure 6:
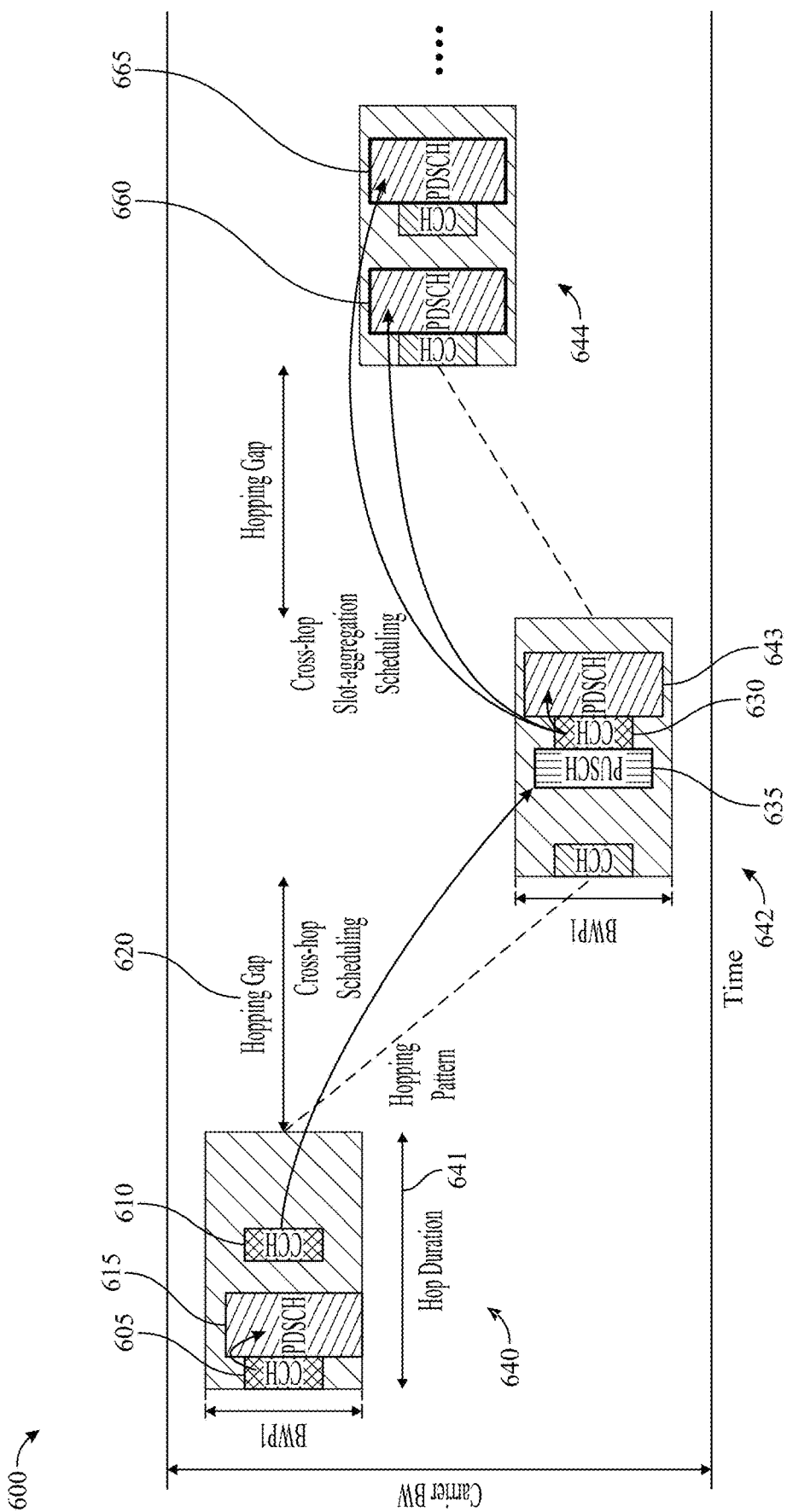
FIG. 6 illustrates example operations for per-bandwidth part (BWP) frequency hopping, in accordance with certain aspects of the present disclosure.

) may change over time, to implement per-BWP frequency hopping, as described in more detail with respect to FIG. 6.

FIG. 6 illustrates example operations 600 for per-BWP frequency hopping, in accordance with aspects of the present disclosure. As illustrated, a single BWP (e.g., BWP1) may be configured with frequency hopping. In certain aspects, BWP1 may have associated configurations, such as configurations for a physical downlink control channel (PDCCH), a physical downlink shared channel (PDSCH), a physical uplink control channel (PUCCH), a physical uplink shared channel (PUSCH), and reference signals (RS), such as a channel state information (CSI)-RS. For example, control channel (CCH) 605 during frequency hop 640 may be used to configure resources for PDSCH 615 to be received by a UE during frequency hop 640.

For any associated configuration with the BWP, frequency-domain resource allocation (if any) may be configured with respect to a reference point (e.g., a reference frequency location) within the BWP. The reference point may be the physical resource block (PRB) with the lowest index in the BWP. Regardless of the absolute frequency location of the BWP (e.g., which may be time-varying), the same relative position of resources within the BWP may be maintained. For example, a configuration of CSI-RS and random access channel (RACH) resources may be modified using the corresponding resources' relative position.

In certain aspects, the associated procedures for the BWP may be transparent to the frequency hopping. For example, HARQ processes may be maintained across frequency hops (e.g., without dropping of HARQ feedback across frequency hops). In other words, PDSCH 615 may be received by a UE during frequency hop 640, but the acknowledgment for the PDSCH 615 may be transmitted by the UE (e.g., PUCCH) during a different frequency hop (e.g., frequency hop 642).

In certain aspects, various timers such as discontinuous reception (DRX) timers, BWP inactivity timer, data inactivity timer, may not be impacted by the frequency hopping. In other words, the timers may continue even though the BWP frequency has changed from one hop to another.

In certain aspects, cross-hop scheduling may be implemented. For example, CCH 610 may be used to configure resources for communication during a different frequency hop, such as the PUSCH 635 during frequency hop 642.

In certain aspects, a symbol or slot-wise transition gap may be configured between frequency hops. In this case, slot counting (e.g., scheduling offset) and/or timers may be suspended during the gap between adjacent frequency hops. For example, a frequency hopping gap 620 may exist between frequency hops 640, 642. The gap 620 may be configured to allow time for RF front-end circuitry of the UE to be reconfigured for the new frequency location of the BWP.

Certain aspects provide techniques for determining a frequency location of a BWP during each of multiple frequency hops. In certain implementations, frequency hopping may be implemented using a fixed offset. For example, frequency hopping may be from a reference point (e.g., $$N_{BWP,0}^{start}$$

(e.g., reference frequency location) based on a predetermined or configured frequency offset $\Delta N_{BWP}$. That is, the frequency location at the $i^{th}$ frequency hop (e.g., i being an integer equal to or greater than 1) may be determined based on the equation:

$$N_{BWP,i}^{start} = (N_{BWP,0}^{start} + i \cdot \Delta N_{BWP}) \bmod N_{total}$$

where $$N_{BWP,i}^{start}$$

is the frequency location of the BWP during frequency hop i, $$N^{start}_{BWP,0}$$

is the frequency location of the reference point (e.g., frequency location of a reference BWP for i=0), $\Delta N_{BWP}$ is the configured fixed frequency offset, and $N_{total}$ is the total number of frequency hops of the BWP.

In certain aspects, the frequency hopping may be implemented using a predetermined or configured sequence. For example, the frequency hopping may be calculated from a reference point $$N^{start}_{BWP,0}$$

based on a predetermined or configured sequence $\{\Delta N_{BWP,0}, \ldots, \Delta N_{BWP,K-1}\}$. The frequency location at the $i^{th}$ frequency hop may then be determined based on equation:

$$N^{start}_{BWP,i} = (N^{start}_{BWP,0} + i \cdot \Delta N_{BWP,i}) \bmod N_{total}.$$

In certain aspects, additional parameters for the frequency hopping may be configured such as the frequency hop duration (e.g., duration 641 as illustrated in FIG. 6) and the gap between frequency hops (e.g., gap 620 as illustrated in FIG. 6). In certain aspects, a UE may report its capability and/or preference on parameters for the frequency hopping to facilitate configuration of the per-BWP frequency hopping.

Certain aspects of the present disclosure are directed to techniques for cross-hop scheduling. For example, as described herein, CCH 610 transmitted during frequency hop 640 may allocate resources for communication during frequency hop 642. In some cases, cross-hop slot aggregation may be implemented. For example, CCH 630 may allocate resources for PDSCH 643 during frequency hop 642 and resources for PDSCHs 660, 665 that are during frequency hop 644. The PDSCHs 643, 660, 665 may include the same data, or different redundancy versions of the same data, allowing for aggregation of the data for decoding.

In certain aspects, cross-hop aperiodic-CSI (A-CSI) triggering may be implemented. For example, during frequency hop 640, the UE may receive control information triggering measurement of CSI-RS (e.g., for A-CSI measurement) and perform the measurement based on the CSI-RS received during frequency hop 642, and transmit a report of the measurement during frequency hop 644. In some cases, cross-hop CSI measurement and reporting may be implemented. For example, periodic or semi-persistent CSI measurement and reporting may be configured. Thus, a UE may perform measurement based on CSI-RS received during frequency hop 640, but transmit a report the measurement during frequency hop 642.

In some cases, cross-hop quasi-co location (QCL) (e.g., QCL-TypeD) may be implemented. For example, by allowing cross-hop CSI measurement and reporting, QCL relationships of signaling (QCL relation of CSI-RS) may be defined across frequency hops. For example, signals communicated via different frequency hops may be quasi-co located with respect to Doppler shift, Doppler spread, average delay, delay spread, and/or spatial parameters.

In certain aspects, cross-hop HARQ feedback may be implemented, as described herein. In other words, HARQ processes may be maintained across frequency hops (e.g., without dropping of HARQ feedback across the frequency hops). For instance, PDSCH 615 may be received by a UE during frequency hop 640, but the acknowledgment for the PDSCH 615 may be transmitted by the UE during a different frequency hop (e.g., frequency hop 642).

Certain aspects of the present disclosure are directed to per-BWP frequency hopping with BWP switching. For example, multiple BWPs may be configured, with switching between BWPs. For example, a BWP configured without per-BWP frequency hopping may schedule resources in another BWP that may be configured with per-BWP frequency hopping, as described in more detail herein.

Figure 7:
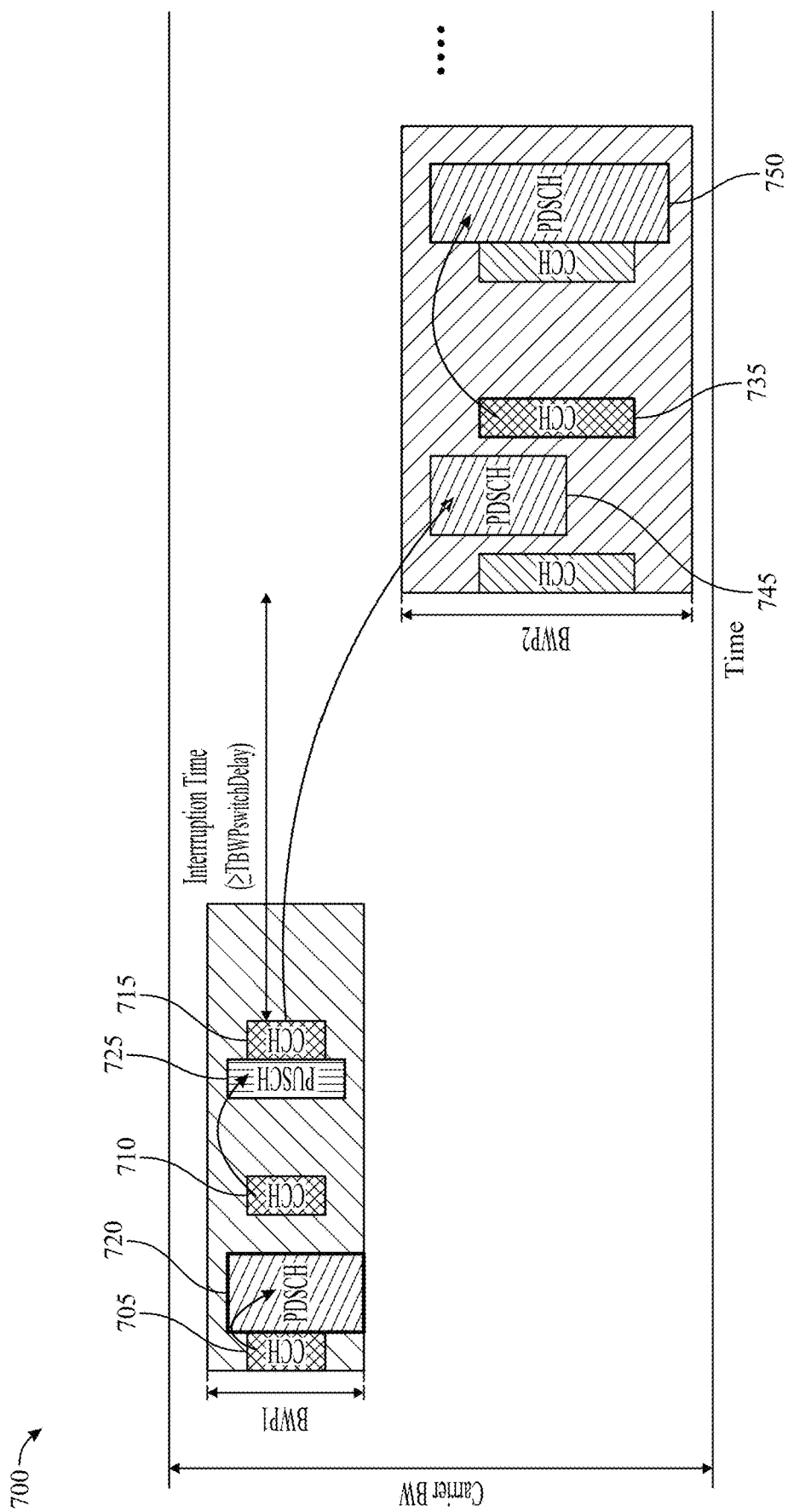
FIG. 7 illustrates example operations for BWP switching, in accordance with certain aspects of the present disclosure.

FIG. 7 illustrates example operations 700 for BWP switching, in accordance with aspects of the present disclosure. As illustrated, two BWPs (e.g., BWP1 and BWP2) may be configured. Each of BWP1 and BWP2 may have its own associated configurations, such as PDCCH, PDSCH, PUCCH, PUSCH, and RS configurations. For instance, BWP1 may have CCH 705 allocating resources for PDSCH 720, and CCH 710 that allocated resources for PUSCH 725. A BWP may be dynamically switched by scheduling downlink control information (DCI) (e.g., format 0_1/1_1). For example, as illustrated, CCH 715 in BWP1 may allocate resources for PDSCH 745 in BWP2. BWP2 may also have its own associated configurations. For example, CCH 735 may allocate resources for PDSCH 750. As illustrated, a gap may exist between BWP1 and BWP2, resulting in an interruption time equal to or greater than the BWP switch delay (e.g., TBWPswitchDelay). The gap allows for reconfiguration of RF front-end circuitry for the new BWP.

In some aspects, if multiple BWPs are configured, each BWP may be configured either with or without frequency hopping. For example, BWP1 in FIG. 7 may be configured without frequency hopping and BWP2 in FIG. 7 may be configured with frequency hopping.

In certain aspects, a BWP (e.g. BWP1 in FIG. 7) may be designated as a default or fallback BWP. The default/fallback BWP may not be allowed to be configured with frequency hopping. The default/fallback BWP may be used to deliver (e.g., transmit or broadcast) control information and data. In certain aspects, a BWP inactivity timer may be configured for implicit BWP switching to the default BWP. For example, if the UE detects inactivity on BWP2 for a configured inactivity period (e.g. time duration), the UE may switch to monitoring BWP1 that is designated as a default/backup BWP. In some aspects, to avoid ambiguity, radio resource control (RRC) reconfiguration of a hopping pattern of a frequency hopping-BWP may be handled on the fallback BWP. In other words, a hopping pattern of a frequency-hopping BWP (e.g., BWP2) may be reconfigured via control signaling using the default/fallback BWP.

Certain aspects of the present disclosure provide triggering mechanisms for per-BWP frequency hopping. One type of triggering mechanism may be for semi-static frequency hopping. For semi-static frequency hopping, the hopping pattern may be configured by higher layer signaling (e.g., RRC signaling). For example, if there is only one configured BWP and the BWP has frequency hopping, the associated hopping configuration may be applied statically. For instance, the reception of a configuration for the BWP may trigger the frequency hopping for the BWP. Thus, the frequency hopping occurs based on a configured pattern and schedule. Another type of triggering mechanism may be for dynamic hopping. For example, if multiple BWPs are configured, there may be BWP switching from a default/fallback BWP (e.g., BWP1) to another BWP (e.g., BWP2) with dynamically initiated frequency hopping. For instance, CCH 715 may be used to allocate resources in BWP2, and BWP2 may be configured with frequency hopping. Thus, the allocation of the resources in BWP2 triggers the frequency hopping in BWP2.

Certain aspects of the present disclosure are directed to cross-hop beam sweeping. For instance, a UE may determine at least one configuration parameter (e.g., for beamforming) for each of a plurality of frequency hops based on a configured sequence of the configuration parameters. The at least one configuration parameter may include one or more beamforming parameters, one or more spatial precoding parameters, or one or more transmit power control parameters. In other words, beams (e.g., beamforming parameters) for control and data communication may changes over frequency hops. The beams may change in accordance with a configured sequence of the beams. Cross-hop beam sweeping techniques described herein may provide additional spatial diversity gain, in addition to the frequency diversity gain due to frequency hopping.

Figure 8:
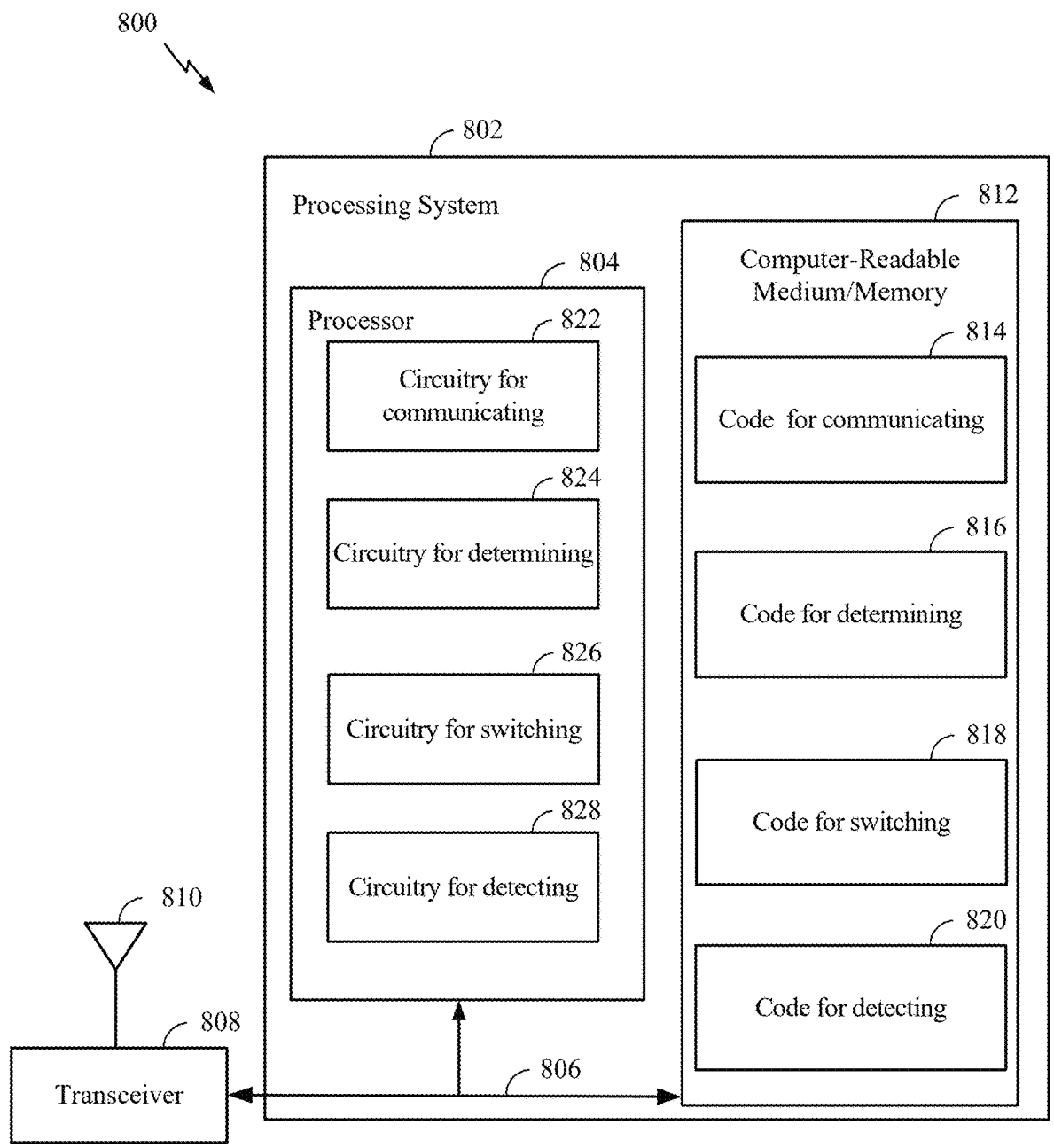
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 4. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 4, or other operations for performing the various techniques discussed herein for per-BWP frequency hopping. In certain aspects, computer-readable medium/memory 812 stores code 814 for communicating (e.g., transmitting and/or receiving); code 816 for determining; code 818 for switching; and code 820 for detecting. In certain aspects, the processor 804 has circuitry configured to implement the code stored in the computer-readable medium/memory 812. The processor 804 includes circuitry 822 for communicating; circuitry 824 for determining; circuitry 826 for switching; and circuitry 828 for detecting. In aspects, communicating may include at least one of receiving and transmitting.

Figure 9:
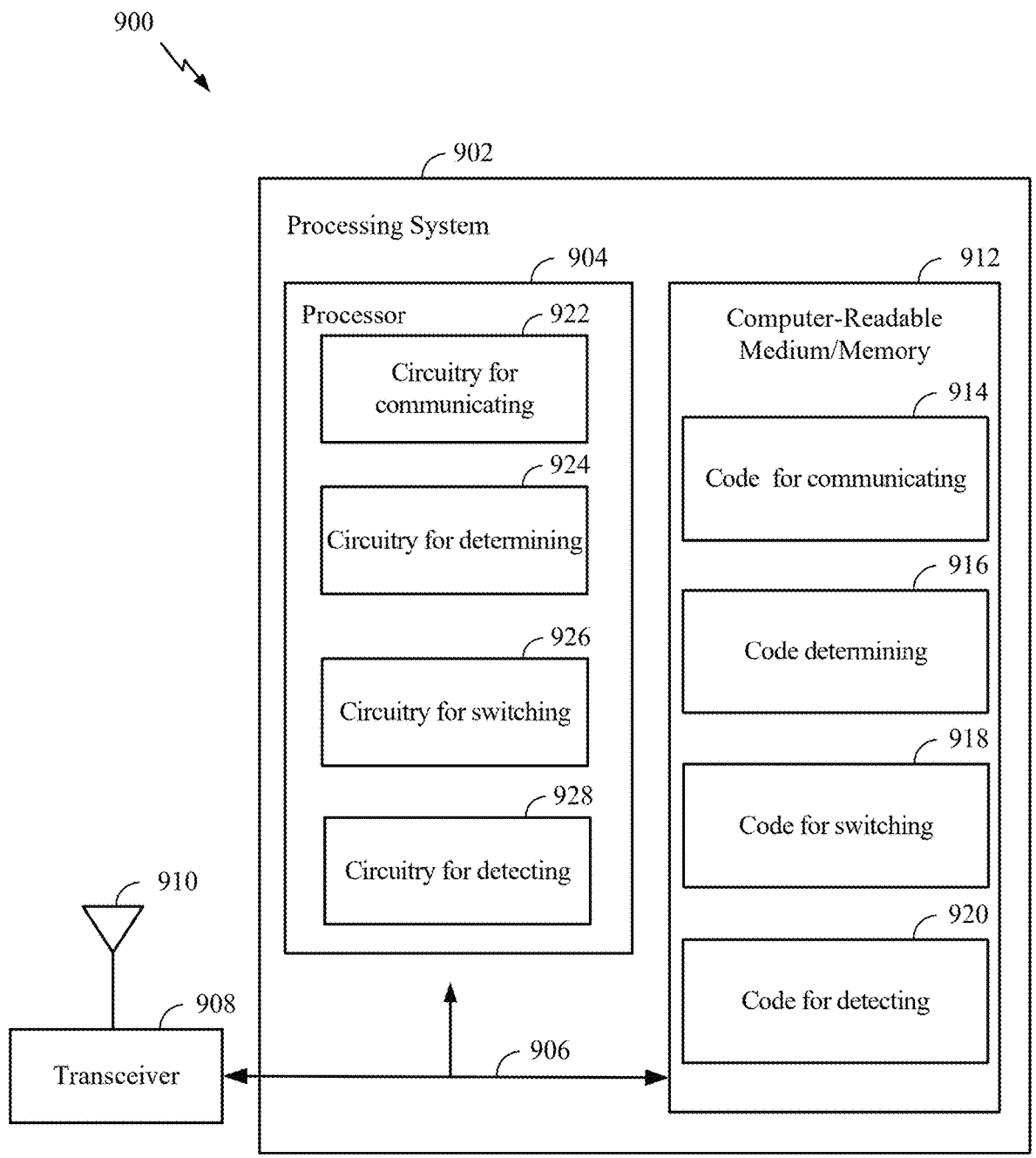
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 5 The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that, when executed by the processor 904, cause the processor 904 to perform the operations illustrated in FIG. 5, or other operations for performing the various techniques discussed herein for per BWP frequency hopping. In certain aspects, computer-readable medium/memory 912 stores code 914 for communicating; code 916 for determining; code 918 for switching; and code 920 for detecting. In certain aspects, the processor 904 has circuitry configured to implement the code stored in the computer-readable medium/memory 912. The processor 904 includes circuitry 922 for communicating; circuitry 924 for determining; circuitry 926 for switching; and circuitry 928 for detecting. In aspects, communicating may include at least one of receiving and transmitting.

Example Aspects

Aspect 1. A method for wireless communication by a user-equipment (UE), comprising: receiving, from a network entity, a configuration for a first bandwidth part (BWP) configured with frequency hopping; determining a frequency location of the first BWP during each of a plurality of frequency hops for the frequency hopping based on a reference frequency location; and communicating with the network entity via the first BWP and in accordance with the configuration.

Aspect 2. The method of aspect 1, wherein the frequency location of the first BWP during each of the plurality of frequency hops is determined based on a fixed frequency offset from the reference frequency location.

Aspect 3. The method of aspect 2, wherein the frequency location of the first BWP during each of the plurality of frequency hops is determined based on product of the fixed frequency offset and an integer equal to or greater than 1.

Aspect 4. The method of any one of aspects 1-3, wherein the frequency location of the first BWP during each of the plurality of frequency hops is determined based on a sequence of frequency offsets from the reference frequency location, each of the frequency offsets being used to determine the frequency location during one of the plurality of frequency hops.

Aspect 5. The method of any one of aspects 1-4, further comprising determining at least one configuration parameter for each of the plurality of frequency hops based on a configured sequence of the configuration parameters.

Aspect 6. The method of aspect 5, wherein the at least one configuration parameter comprises at least one of one or more beamforming parameters, one or more spatial precoding parameters, or one or more transmit power control parameters.

Aspect 7. The method of any one of aspects 1-6, further comprising receiving control information in the first BWP for allocation of frequency-domain resources for the communication, wherein the allocation of the frequency-domain resources is indicated using a relative location of the frequency-domain resources with respect to the reference frequency location in the first BWP.

Aspect 8. The method of any one of aspects 1-7, wherein a configuration of frequency-domain resources associated with the first BWP is with respect to the reference frequency location in the first BWP.

Aspect 9. The method of any one of aspects 1-8, wherein the configuration for the first BWP indicates at least one of a duration associated with each of the plurality of frequency hops, a gap between adjacent frequency hops of the plurality of frequency hops, or a pattern associated with the frequency hopping.

Aspect 10. The method of any one of aspects 1-9, further comprising transmitting an indication of a capability or preference of the UE for the frequency hopping, wherein the configuration is in accordance with the capability or preference.

Aspect 11. The method of any one of aspects 1-10, further comprising: receiving a configuration for a default BWP configured without frequency hopping; detecting inactivity on the first BWP for a configured time duration; and switching to monitoring the default BWP based on detection of the inactivity.

Aspect 12. The method of aspect 11, wherein receiving the configuration for the first BWP comprises receiving an indication of a hopping pattern via the default BWP.

Aspect 13. The method of aspect 1, further comprising: receiving a configuration for a second BWP configured without frequency hopping; and receiving control signaling via the second BWP, the control signaling indicating resources to be monitored on the first BWP, wherein the indication of the resources triggers the frequency hopping for the first BWP.

Aspect 14. The method of aspect 13, wherein the second BWP comprises a default BWP.

Aspect 15. The method of any one of aspects 1-14, wherein the reception of the configuration for the first BWP triggers the frequency hopping for the first BWP.

Aspect 16. The method of any one of aspects 1-15, further comprising receiving control information via the first BWP during a first one of the plurality of frequency hops, the control information allocating resources for the communication via the first BWP during a second one of the plurality of frequency hops.

Aspect 17. The method of any one of aspects 1-16, further comprising receiving control information allocating resources for a first data transmission during a first one of the plurality of frequency hops and a second data transmission during a second one of the plurality of frequency hops of the first BWP, the first data transmission being the same as, or a different redundancy version of, the second data transmission.

Aspect 18. The method of aspect 17, further comprising receiving the first data transmission and the second data transmission via the first BWP, and aggregating the first data transmission and the second data transmission for data decoding.

Aspect 19. The method of any one of aspects 1-18, further comprising: receiving, via the first BWP during a first one of the plurality of frequency hops, control information triggering measurement of at least one channel state information (CSI)-reference signal (RS); performing the measurement based on the at least one CSI-RS received via the first BWP during a second one of the plurality of frequency hops; and transmitting a report of the measurement via the first BWP during a third one of the plurality of frequency hops.

Aspect 20. The method of any one of aspects 1-19, further comprising: receiving data via the first BWP during a first one of the plurality of frequency hops; and transmitting feedback via the first BWP during a second one of the plurality of frequency hops indicating whether data has been successfully received by the UE.

Aspect 21. The method of any one of aspects 1-20, further comprising: performing at least one measurement based on at least one channel state information (CSI)-reference signal (RS) received via the first BWP during a first one of the plurality of frequency hops; and transmitting a report of the measurement via the first BWP during a second one of the plurality of frequency hops.

Aspect 22. The method of aspect 21, wherein the at least one measurement comprises at least one periodic or semi-persistent CSI measurement.

Aspect 23. The method of any one of aspects 21-22, wherein signals communicated via the first BWP during different frequency hops of the plurality of frequency hops are quasi-co located with respect to Doppler shift, Doppler spread, average delay, delay spread, or spatial parameters.

Aspect 24. A method for wireless communication, comprising: transmitting, to a user-equipment (UE), a configuration for a first bandwidth part (BWP) configured with frequency hopping; determining a frequency location of the first BWP during each of a plurality of frequency hops for the frequency hopping based on a reference frequency location; and communicating with the UE via the first BWP and in accordance with the configuration.

Aspect 25. The method of aspect 24, wherein the frequency location of the first BWP during each of the plurality of frequency hops is determined based on a fixed frequency offset from the reference frequency location.

Aspect 26. The method of aspect 25, wherein the frequency location of the first BWP during each of the plurality of frequency hops is determined based on product of the fixed frequency offset and an integer equal to or greater than 1.

Aspect 27. The method of any one of aspects 24-26, wherein the frequency location of the first BWP during each of the plurality of frequency hops is determined based on a sequence of frequency offsets from the reference frequency location, each of the frequency offsets being used to determine the frequency location during one of the plurality of frequency hops.

Aspect 28. The method of any one of aspects 24-27, further comprising transmitting control information in the first BWP for allocation of frequency-domain resources for the communication, wherein the allocation of the frequency-domain resources is indicated using a relative location of the frequency-domain resources with respect to the reference frequency location in the first BWP.

Aspect 29. The method of any one of aspects 24-28, wherein a configuration of frequency-domain resources associated with the first BWP is with respect to the reference frequency location in the first BWP.

Aspect 30. The method of any one of aspects 24-29, wherein the configuration for the first BWP indicates at least one of a duration associated with each of the plurality of frequency hops, a gap between adjacent frequency hops of the plurality of frequency hops, or a pattern associated with the frequency hopping.

Aspect 31. The method of any one of aspects 24-30, further comprising receiving an indication of a capability or preference of the UE for the frequency hopping, wherein the configuration is in accordance with the capability or preference.

Aspect 32. The method of any one of aspects 24-31, further comprising transmitting a configuration for a default BWP configured without frequency hopping, wherein the UE switches to monitoring the default BWP based on detection of inactivity on the first BWP for a configured time duration.

Aspect 33. The method of aspect 32, wherein transmitting the configuration for the first BWP comprises transmitting an indication of a hopping pattern via the default BWP.

Aspect 34. The method of any one of aspects 24-33, further comprising: transmitting a configuration for a second BWP configured without frequency hopping; and transmitting control signaling via the second BWP, the control signaling indicating resources to be monitored on the first BWP, wherein the indication of the resources triggers the frequency hopping for the first BWP at the UE.

Aspect 35. The method of aspect 34, wherein the second BWP comprises a default BWP.

Aspect 36. The method of any one of aspects 24-35, wherein the transmitting of the configuration for the first BWP triggers the frequency hopping for the first BWP at the UE.

Aspect 37. The method of any one of aspects 24-36, further comprising transmitting control information via the first BWP during a first one of the plurality of frequency hops, the control information allocating resources for the communication via the first BWP during a second one of the plurality of frequency hops.

Aspect 38. The method of any one of aspects 24-37, further comprising transmitting control information allocating resources for a first data transmission during a first one of the plurality of frequency hops and a second data transmission during a second one of the plurality of frequency hops of the first BWP, the first data transmission being the same as, or a different redundancy version of, the second data transmission.

Aspect 39. The method of any one of aspects 24-38, further comprising: transmitting, via the first BWP during a first one of the plurality of frequency hops, control information triggering measurement of at least one channel state information (CSI)-reference signal (RS), wherein the measurement is performed based on the at least one CSI-RS transmitted via the first BWP during a second one of the plurality of frequency hops; and receiving a report of the measurement via the first BWP during a third one of the plurality of frequency hops.

Aspect 40. The method of any one of aspects 24-39, further comprising: transmitting data via the first BWP during a first one of the plurality of frequency hops; and receiving feedback via the first BWP during a second one of the plurality of frequency hops indicating whether data has been successfully received by the UE.

Aspect 41. The method of any one of aspects 24-40, further comprising: receiving a report of at least one measurement performed based on at least one channel state information (CSI)-reference signal (RS) transmitted via the first BWP during a first one of the plurality of frequency hops, wherein the report is received via the first BWP during a second one of the plurality of frequency hops.

Aspect 42. The method of aspect 41, wherein the at least one measurement comprises at least one periodic or semi-persistent CSI measurement.

Aspect 43. The method of any one of aspects 41-42, wherein signals communicated via the first BWP during different frequency hops of the plurality of frequency hops are quasi-co located with respect to Doppler shift, Doppler spread, average delay, delay spread, or spatial parameters.

Aspect 44. An apparatus comprising means for performing the method of any of aspects 1 through 43.

Aspect 45. An apparatus comprising at least one processor and a memory coupled to the at least one processor, the memory comprising code executable by the at least one processor to cause the apparatus to perform the method of any of aspects 1 through 43.

Aspect 46. A computer readable medium storing computer executable code thereon for wireless communications that, when executed by at least one processor, cause an apparatus to perform the method of any of aspects 1 through 43.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/ device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4 and/or FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
receiving, from a network entity, a configuration for a first bandwidth part (BWP) configured with frequency hopping, wherein the configuration comprises a configuration for one or more of a control channel, uplink shared channel, downlink shared channel, or reference signals within the first BWP;
determining a frequency location of the first BWP during each of a plurality of frequency hops for the frequency hopping based on a reference frequency location and a number of hops in the plurality of frequency hops, wherein:
the reference frequency location comprises a location fixed over the plurality of frequency hops;
the frequency location of the first BWP during each of the plurality of frequency hops is determined based on a sequence of frequency offsets from the reference frequency location, each of the frequency offsets being used to determine the frequency location during one of the plurality of frequency hops; and
the configuration for the first BWP indicates at least two of a duration associated with each of the plurality of frequency hops, a time gap between adjacent frequency hops of the plurality of frequency hops, or a pattern associated with the frequency hopping; and communicating with the network entity via the first BWP and in accordance with the configuration.

2. The method of claim 1, further comprising determining at least one configuration parameter for each of the plurality of frequency hops based on a configured sequence of the configuration parameters, wherein the at least one configuration parameter comprises at least one of one or more beamforming parameters, one or more spatial precoding parameters, or one or more transmit power control parameters.

3. The method of claim 1, further comprising receiving control information in the first BWP for allocation of frequency-domain resources for the communication, wherein the allocation of the frequency-domain resources is indicated using a relative location of the frequency-domain resources with respect to the reference frequency location in the first BWP.

4. The method of claim 1, wherein a configuration of frequency-domain resources associated with the first BWP is with respect to the reference frequency location in the first BWP.

5. The method of claim 1, further comprising transmitting an indication of a capability or preference of the UE for the at least two of the duration associated with each of the plurality of frequency hops, the time gap between adjacent frequency hops of the plurality of frequency hops, or the pattern associated with the frequency hopping, wherein the configuration is in accordance with the capability or preference.

6. The method of claim 1, further comprising:
receiving a configuration for a default BWP configured without frequency hopping;
detecting inactivity on the first BWP for a configured time duration; and
switching to monitoring the default BWP based on detection of the inactivity.

7. The method of claim 1, further comprising:
receiving a configuration for a second BWP configured without frequency hopping; and
receiving control signaling via the second BWP, the control signaling indicating resources to be monitored on the first BWP, wherein the indication of the resources triggers the frequency hopping for the first BWP.

8. The method of claim 1, wherein the reception of the configuration for the first BWP triggers the frequency hopping for the first BWP.

9. The method of claim 1, further comprising receiving control information via the first BWP during a first one of the plurality of frequency hops, the control information allocating resources for the communication via the first BWP during a second one of the plurality of frequency hops.

10. The method of claim 1, further comprising receiving control information allocating resources for a first data transmission during a first one of the plurality of frequency hops and a second data transmission during a second one of the plurality of frequency hops of the first BWP, the first data transmission being the same as, or a different redundancy version of, the second data transmission.

11. The method of claim 1, further comprising:
receiving, via the first BWP during a first one of the plurality of frequency hops, control information triggering measurement of at least one channel state information (CSI)-reference signal (RS);
performing the measurement based on the at least one CSI-RS received via the first BWP during a second one of the plurality of frequency hops; and
transmitting a report of the measurement via the first BWP during a third one of the plurality of frequency hops.

12. The method of claim 1, further comprising:
receiving data via the first BWP during a first one of the plurality of frequency hops; and
transmitting feedback via the first BWP during a second one of the plurality of frequency hops indicating whether data has been successfully received by the UE.

13. The method of claim 1, further comprising:
performing at least one measurement based on at least one channel state information (CSI)-reference signal (RS) received via the first BWP during a first one of the plurality of frequency hops; and
transmitting a report of the measurement via the first BWP during a second one of the plurality of frequency hops.

14. A method for wireless communication, comprising:
transmitting, to a user-equipment (UE), a configuration for a first bandwidth part (BWP) configured with frequency hopping, wherein the configuration comprises a configuration for one or more of a control channel, uplink shared channel, downlink shared channel, or reference signals within the first BWP;
determining a frequency location of the first BWP during each of a plurality of frequency hops for the frequency hopping based on a reference frequency location and a number of hops in the plurality of frequency hops, wherein:
the reference frequency location comprises a location fixed over the plurality of frequency hops;
the frequency location of the first BWP during each of the plurality of frequency hops is determined based on a sequence of frequency offsets from the reference frequency location, each of the frequency offsets being used to determine the frequency location during one of the plurality of frequency hops; and
the configuration for the first BWP indicates at least two of a duration associated with each of the plurality of frequency hops, a time gap between adjacent frequency hops of the plurality of frequency hops, or a pattern associated with the frequency hopping; and
communicating with the UE via the first BWP and in accordance with the configuration.

15. The method of claim 14, further comprising transmitting control information in the first BWP for allocation of frequency-domain resources for the communication, wherein the allocation of the frequency-domain resources is indicated using a relative location of the frequency-domain resources with respect to the reference frequency location in the first BWP.

16. The method of claim 14, wherein a configuration of frequency-domain resources associated with the first BWP is with respect to the reference frequency location in the first BWP.

17. The method of claim 14, further comprising receiving an indication of a capability or preference of the UE for the at least two of the duration associated with each of the plurality of frequency hops, the time gap between adjacent frequency hops of the plurality of frequency hops, or the pattern associated with the frequency hopping, wherein the configuration is in accordance with the capability or preference.

18. The method of claim 14, further comprising transmitting a configuration for a default BWP configured without frequency hopping, wherein the UE switches to monitoring the default BWP based on detection of inactivity on the first BWP for a configured time duration.

19. The method of claim 14, further comprising:
transmitting a configuration for a second BWP configured without frequency hopping; and
transmitting control signaling via the second BWP, the control signaling indicating resources to be monitored on the first BWP, wherein the indication of the resources triggers the frequency hopping for the first BWP at the UE.

20. The method of claim 14, further comprising transmitting control information via the first BWP during a first one of the plurality of frequency hops, the control information allocating resources for the communication via the first BWP during a second one of the plurality of frequency hops.

21. The method of claim 14, further comprising transmitting control information allocating resources for a first data transmission during a first one of the plurality of frequency hops and a second data transmission during a second one of the plurality of frequency hops of the first BWP, the first data transmission being the same as, or a different redundancy version of, the second data transmission.

22. The method of claim 14, further comprising:
transmitting, via the first BWP during a first one of the plurality of frequency hops, control information triggering measurement of at least one channel state information (CSI)-reference signal (RS), wherein the measurement is performed based on the at least one CSI-RS transmitted via the first BWP during a second one of the plurality of frequency hops; and
receiving a report of the measurement via the first BWP during a third one of the plurality of frequency hops.

23. The method of claim 14, further comprising:
transmitting data via the first BWP during a first one of the plurality of frequency hops; and
receiving feedback via the first BWP during a second one of the plurality of frequency hops indicating whether data has been successfully received by the UE.

24. The method of claim 14, further comprising receiving a report of at least one measurement performed based on at least one channel state information (CSI)-reference signal (RS) transmitted via the first BWP during a first one of the plurality of frequency hops, wherein the report is received via the first BWP during a second one of the plurality of frequency hops.

25. An apparatus, comprising:
memory having executable instructions stored thereon; and
one or more processors configured to execute the executable instructions in order to cause the apparatus to:
receive, from a network entity, a configuration for a first bandwidth part (BWP) configured with frequency hopping, wherein the configuration comprises a configuration for one or more of a control channel, uplink shared channel, downlink shared channel, or reference signals within the first BWP;
determine a frequency location of the first BWP during each of a plurality of frequency hops for the frequency hopping based on a reference frequency location and a number of hops in the plurality of frequency hops, wherein:
the reference frequency location comprises a location fixed over the plurality of frequency hops, and
the frequency location of the first BWP during each of the plurality of frequency hops is determined based on a sequence of frequency offsets from the reference frequency location, each of the frequency offsets being used to determine the frequency location during one of the plurality of frequency hops; and
the configuration for the first BWP indicates at least two of a duration associated with each of the plurality of frequency hops, a time gap between adjacent frequency hops of the plurality of frequency hops, or a pattern associated with the frequency hopping; and
communicate with the network entity via the first BWP and in accordance with the configuration.

26. The apparatus of claim 25, wherein the one or more processors are further configured, individually or collectively, to execute the executable instructions in order to cause the apparatus to:
transmit an indication of a capability or preference of the apparatus for the at least two of the duration associated with each of the plurality of frequency hops, the time gap between adjacent frequency hops of the plurality of frequency hops, or the pattern associated with the frequency hopping, wherein the configuration is in accordance with the capability or preference.

27. The method of claim 1, wherein the configuration for the first BWP indicates the duration associated with each of the plurality of frequency hops, the time gap between adjacent frequency hops of the plurality of frequency hops, and the pattern associated with the frequency hopping.

28. The method of claim 1, further comprising configuring resources for a physical downlink shared channel (PDSCH) included in the first BWP during a frequency hop of the plurality of frequency hops using the control channel transmitted during the frequency hop of the plurality of frequency hops.

29. The method of claim 1, further comprising configuring resources for a physical downlink shared channel (PDSCH) included in the first BWP during a first frequency hop of the plurality of frequency hops using the control channel transmitted during a second frequency hop of the plurality of frequency hops, the first frequency hop of the plurality of frequency hops occurring after the second frequency hop of the plurality of frequency hops.

30. The method of claim 29, further comprising configuring resources for the PDSCH included in the first BWP during a third frequency hop of the plurality of frequency hops using the control channel transmitted during the first frequency hop of the plurality of frequency hops, the third frequency hop of the plurality of frequency hops occurring after the first frequency hop of the plurality of frequency hops.

* * * * *